(12) United States Patent
McKethan

(10) Patent No.: US 7,472,373 B2
(45) Date of Patent: Dec. 30, 2008

(54) METHOD AND SYSTEM TO GAUGE AND CONTROL PROJECT CHURN

(75) Inventor: Kenneth McKethan, Dunn, NC (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/708,262

(22) Filed: Feb. 20, 2004

(65) Prior Publication Data

US 2005/0188344 A1 Aug. 25, 2005

(51) Int. Cl.
*G06F 9/44* (2006.01)
(52) U.S. Cl. .......................................... 717/101; 705/8
(58) Field of Classification Search ................... None
See application file for complete search history.

(56) References Cited

U.S. PATENT DOCUMENTS

| | | | | |
|---|---|---|---|---|
| 5,406,476 | A | * | 4/1995 | Deziel et al. .................... 705/8 |
| 5,623,404 | A | * | 4/1997 | Collins et al. ................... 705/9 |
| 5,826,236 | A | * | 10/1998 | Narimatsu et al. ............. 705/8 |
| 2003/0225748 | A1 | * | 12/2003 | Haeberle ....................... 707/3 |

* cited by examiner

*Primary Examiner*—Michael J Yigdall
(74) *Attorney, Agent, or Firm*—Charles L. Moore; R. Brian Drozd; Moore & Van Allen, PLLC

(57) ABSTRACT

A computer-implemented method to gauge and control churn of a project may include determining an estimated project churn, wherein project churn includes any identifiable and unplanned changes to a scope of the project. The method may also include identifying at least one task of the project requiring rework or modification. The method may additionally include collecting heuristic information on each task of the project requiring rework or modification in response to any potential project changes for determining the estimated project churn. Collecting heuristic information may include at least one of: collecting a time to complete a same or a similar task in another project; sampling a plurality of times to complete the same or similar task in a plurality of other projects; and surveying a plurality of experienced project managers to provide an estimated time requirement to complete the task. The method may also include entering at least optimistic, pessimistic and expected time requirements for reworking or modifying each task of the project requiring rework or modification in response to any potential project changes. The method may further include allocating resources in response to the estimated project churn based on the collected heuristic information and the at least optimistic, pessimistic and expected time requirements for each task of the project.

33 Claims, 8 Drawing Sheets

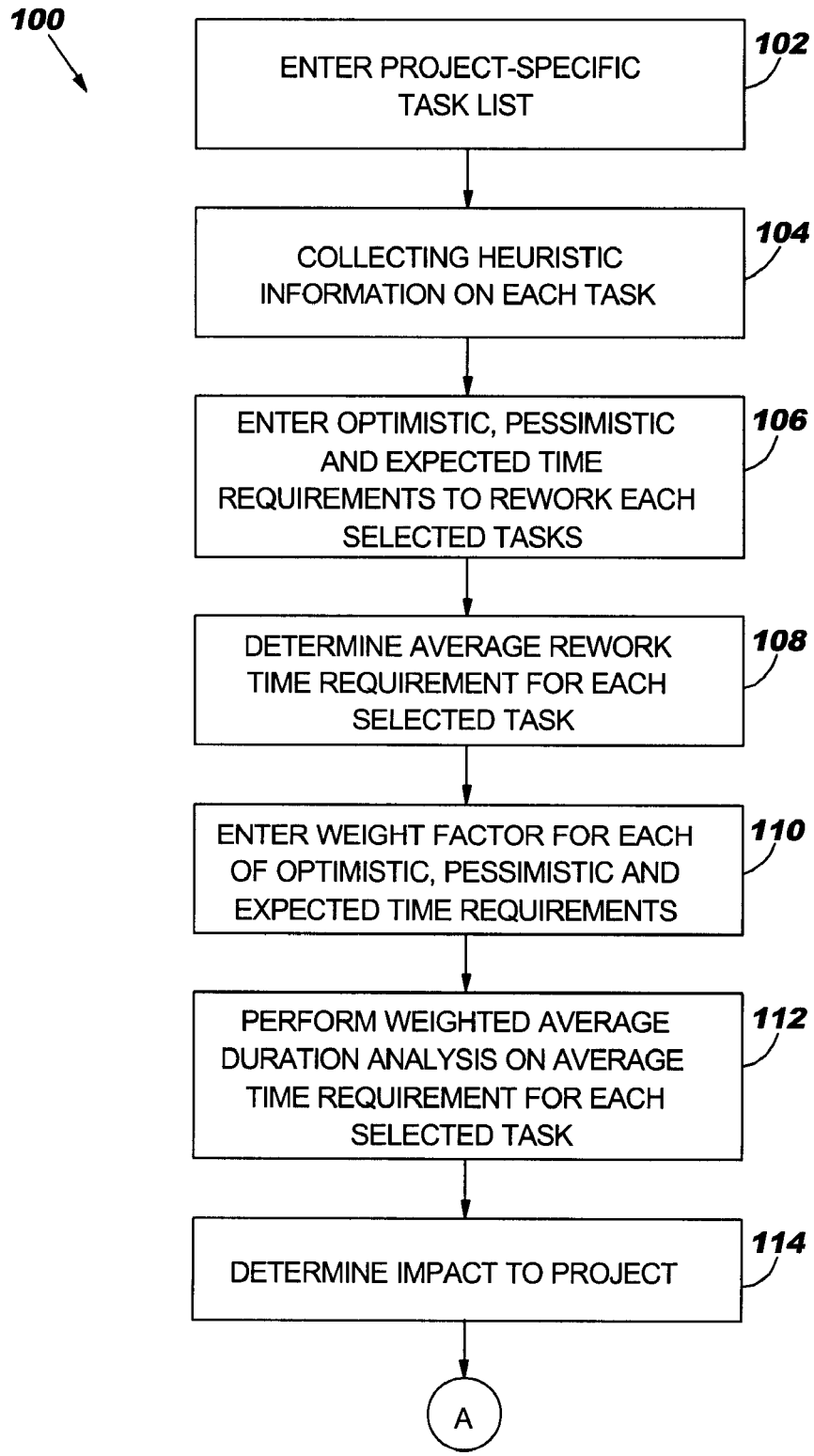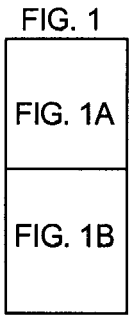

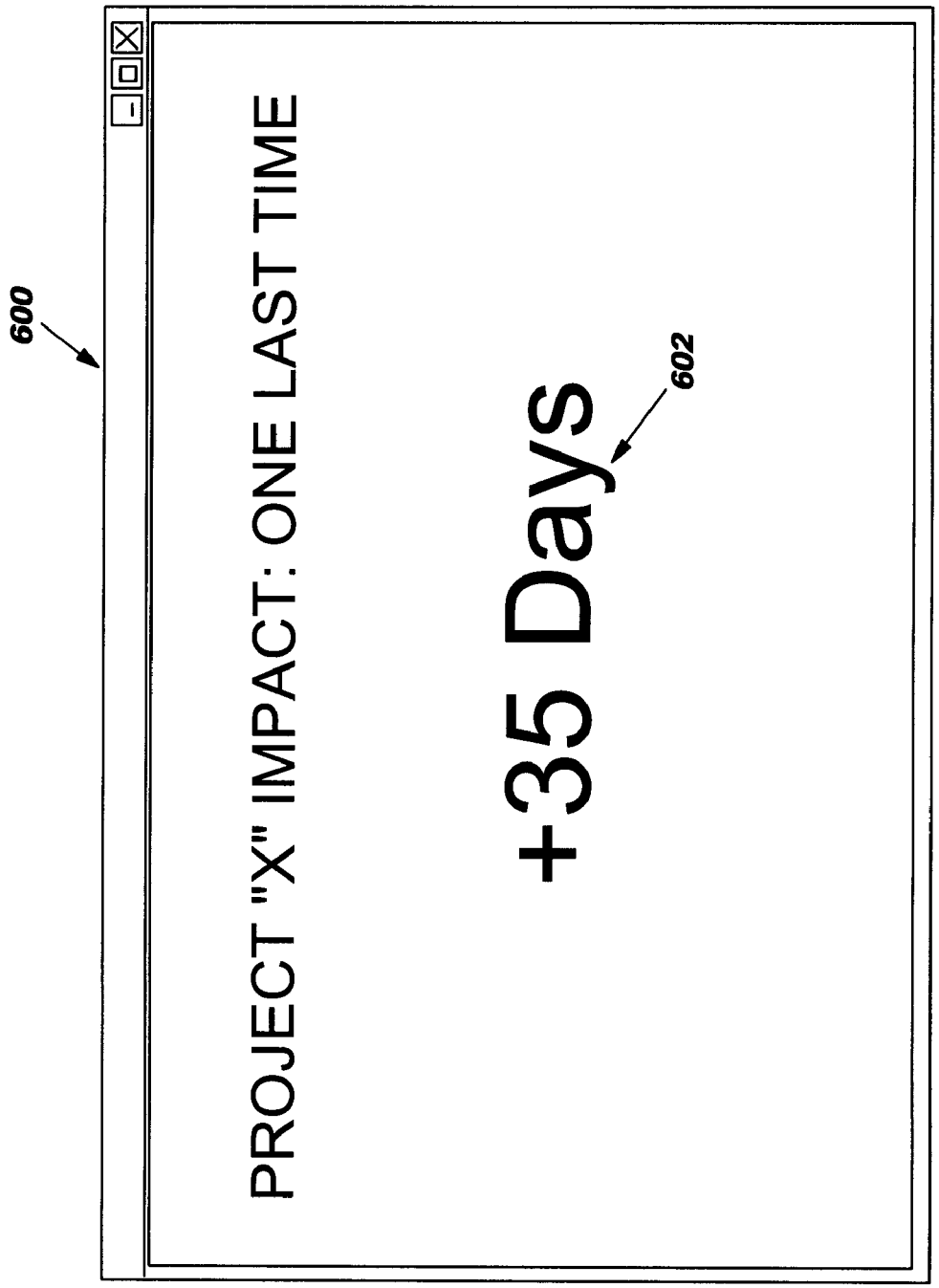

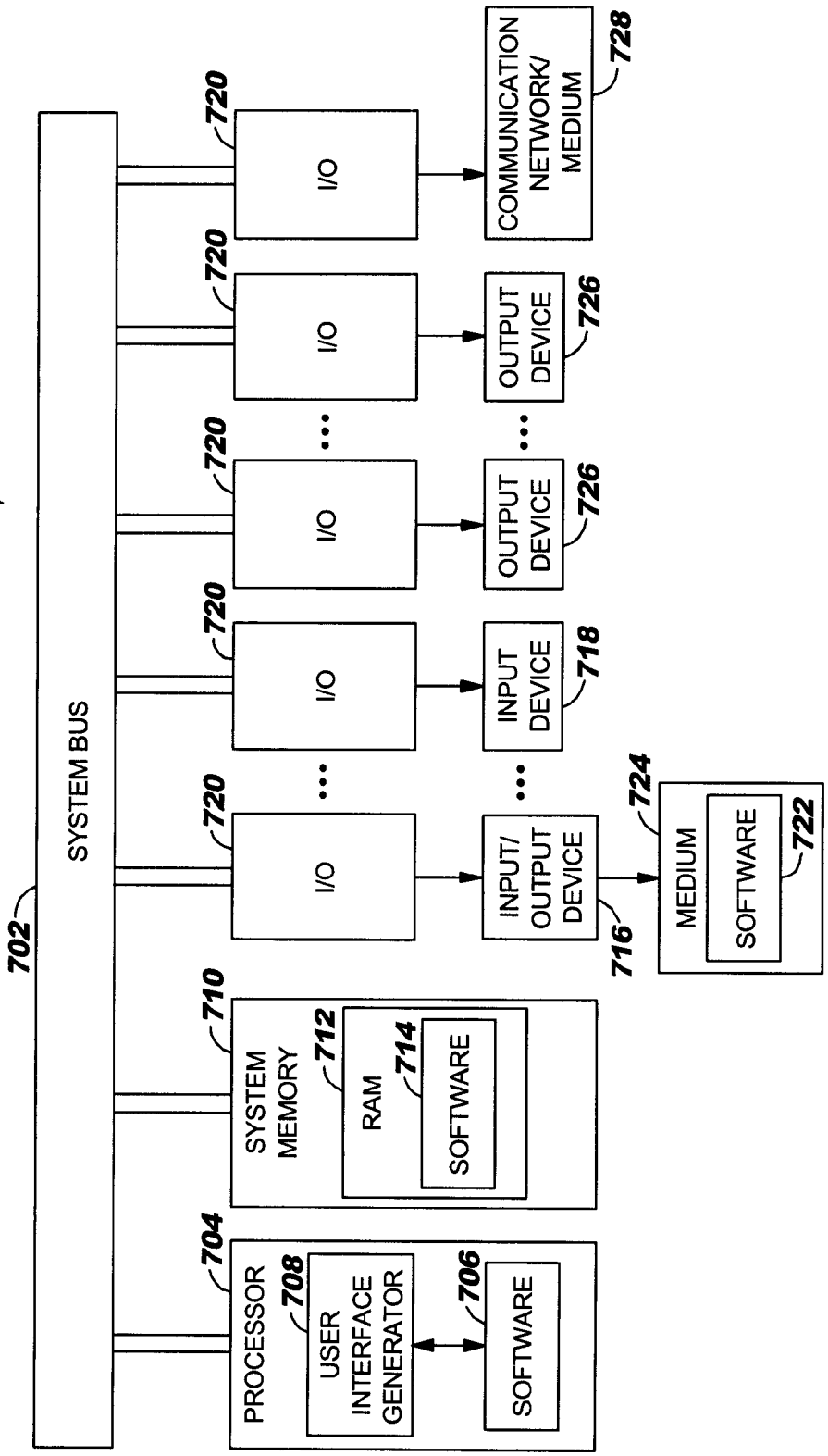

METHOD AND SYSTEM TO GAUGE AND CONTROL PROJECT CHURN

BACKGROUND OF INVENTION

The present invention relates to project management and the like and more particularly to a method and system to gauge and control project churn.

In planning projects, such as software development projects or the like, attempts are made to identify the multiple tasks and subtasks that may be required along with an estimate the time that may be required to complete each of the subtasks and tasks. Proper and accurate planning are important so that projects, particularly complex and time critical projects, can be allocated the proper amount of resources so that the project can be efficiently completed in a time and cost effective manner. However, numerous, frequent and often unplanned changes to a project and the project's schedule can occur for one reason or another. These changes in a project's scope and other variables can be common on some types of projects, such as software development projects or similar projects. Such changes whether identifiable or unplanned may be referred as project churn. Project churn, particularly unplanned project churn can result in a huge and usually undocumented and under-appreciated toll on otherwise well planned project resources. The result can be a "shadow project load" that can be tantamount to having an entire extra project. Under these circumstances, the project often has to be completed without an allocation of additional resources and without recognition of those who have to expend extra effort to successfully complete the project. Such unresourced or under-resourced projects can impact efficiency, resource allocation among projects competing for limited resources, quality and morale. In some situations failure to account for project churn may even jeopardize the successful completion of the project.

SUMMARY OF INVENTION

In accordance with an embodiment of the present invention, a computer-implemented method to gauge and control churn of a project may include determining an estimated project churn, wherein project churn includes any identifiable and unplanned changes to a scope of the project. The method may also include identifying at least one task of the project requiring rework or modification. The method may additionally include collecting heuristic information on each task of the project requiring rework or modification in response to any potential project changes for determining the estimated project churn. Collecting heuristic information may include at least one of: collecting a time to complete a same or a similar task in another project; sampling a plurality of times to complete the same or similar task in a plurality of other projects; and surveying a plurality of experienced project managers to provide an estimated time requirement to complete the task. The method may also include entering at least optimistic, pessimistic and expected time requirements for reworking or modifying each task of the project requiring rework or modification in response to any potential project changes. The method may further include allocating resources in response to the estimated project churn based on the collected heuristic information and the at least optimistic, pessimistic and expected time requirements for each task of the project.

In accordance with another embodiment of the present invention, a method to gauge and control churn of a project may include entering a project-specific task list and identifying at least one task requiring rework or modification. The method may also include entering at least optimistic, pessimistic and expected time requirements to rework or modify each task of the project requiring rework or modification in response to any potential project changes. The method may also include collecting heuristic information on each task of the project to determine the optimistic, pessimistic and expected time requirement to rework or modify each task of the project requiring rework or modification in response to any potential project changes. Collecting the heuristic information may include at least one of: collecting a time to complete a same or a similar task in another project; sampling a plurality of times to complete the same or similar task in a plurality of other projects; and surveying a plurality of experienced project managers to provide an estimated time requirement to complete the task. A weighting factor for each of the optimistic, pessimistic and expected time requirements may be entered to perform a weighted average duration analysis. An average time requirement may be determined to rework or modify each task requiring rework or modification in response to any potential project changes. A weighted average duration analysis may be performed on any tasks requiring rework or modification in response to any potential project changes. An impact to the project may be determined in response to the weighted average duration analysis.

In accordance with another embodiment of the present invention, a system to gauge and control churn of a project may include an input device to enter heuristic information on each task of a project requiring rework or modification in response to any potential project changes. The project may have at least one task requiring rework or modification. The heuristic information may include time to complete a same or a similar task in another project; a sampling of a plurality of times to complete the same or similar task in a plurality of other projects; and a survey a plurality of experienced project managers to provide an estimated time requirement to complete the task. The system may also include a user interface generator to generate a graphical user interface displayable to a user to enter at least optimistic, pessimistic and expected time requirements for reworking or modifying each task of the project requiring rework or modification in response to any potential project changes. The system may also include a processor and an analysis program operable on the processor to determine an impact to the project in response to any potential project changes using the heuristic information. The analysis program may be adapted to utilize the at least optimistic, pessimistic and expected time requirements for each task of the project and a weighting factor for each of the at least optimistic, pessimistic and expected time requirements to determine the impact to the project. An output device may present the impact to a user.

In accordance with another embodiment of the present invention, a computer-readable storage medium having computer-executable instructions for performing a method. The computer-readable storage medium may be one of an electronic, optical, electromagnetic, infrared or semiconductor system. The method may include determining an estimated project churn. The project churn may include any identifiable and unplanned changes to a scope of the project. The method may also include identifying at least one task requiring rework or modification and collecting heuristic information on each task of the project requiring rework or modification in response to any potential project changes for determining the estimated project churn. Collecting heuristic information may include at least one of: collecting a time to complete a same or a similar task in another project; sampling a plurality of times to complete the same or similar task in a plurality of other projects; and surveying a plurality of experienced project managers to provide an estimated time requirement to complete the task. The method may also include entering at least optimistic, pessimistic and expected time requirements for reworking or modifying each task of the project requiring rework or modification in response to any potential project changes. The method may further include allocating resources in response to the estimated project churn based on the collected heuristic information and the at least optimistic, pessimistic and expected time requirements for each task of the project.

BRIEF DESCRIPTION OF DRAWINGS

FIGS. 1A and 1B (collectively FIG. 1) are a flow chart of a method to gauge and control churn of a project in accordance with one embodiment of the present invention.

FIG. 6 is an example of a graphical user interface, screen shot, web page or the like to present an impact of project churn on a project to a user in accordance with an embodiment of the present invention.

FIG. 7 is an example of a system to gauge and control churn of a project in accordance with one embodiment of the present invention.

DETAILED DESCRIPTION

The following detailed description of preferred embodiments refers to the accompanying drawings, which illustrate specific embodiments of the invention. Other embodiments having different structures and operations do not depart from the scope of the present invention.

Figure 1B:
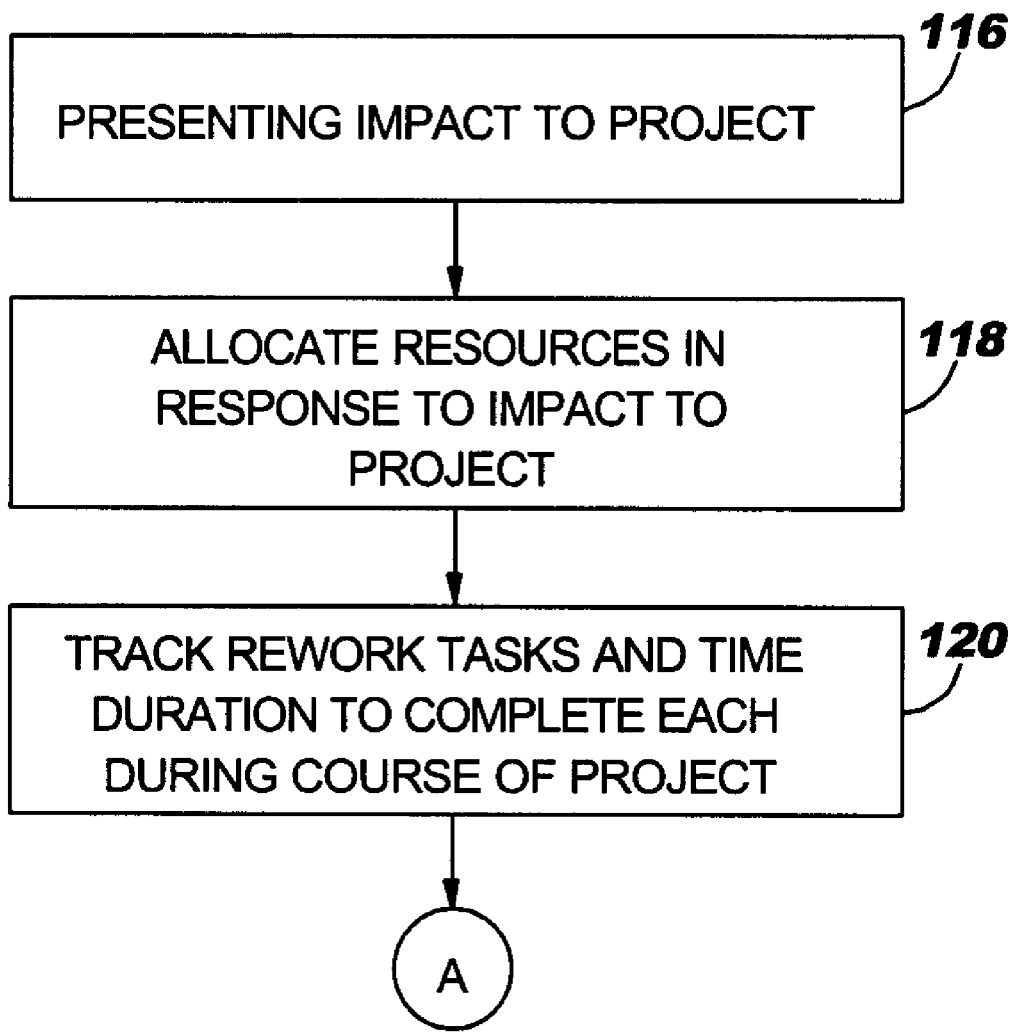
Figure 2:
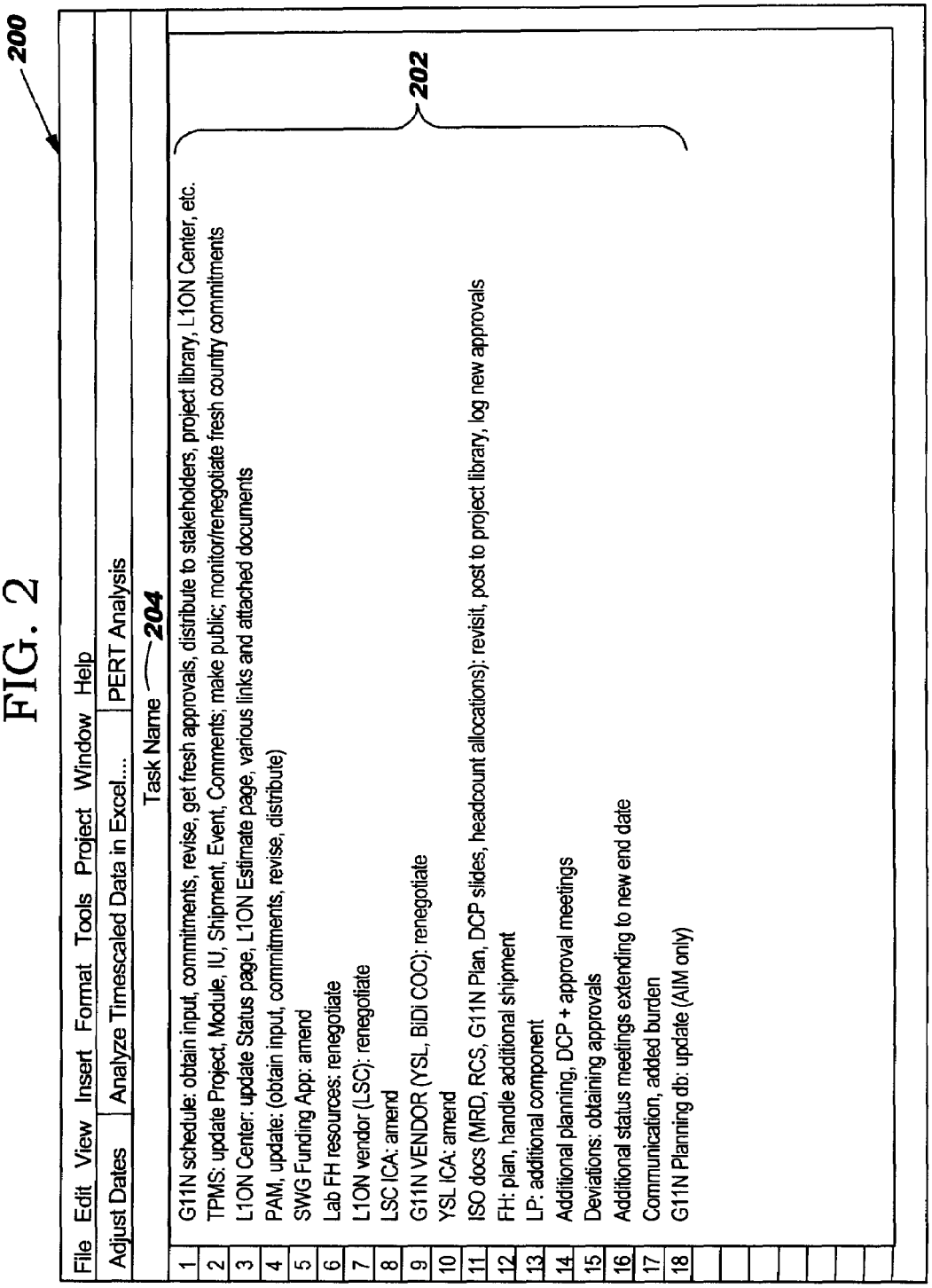
FIG. 2 is an example of a graphical user interface, screen shot or the like for a user to enter a project-specific task list in accordance with an embodiment of the present invention.
Figure 3:
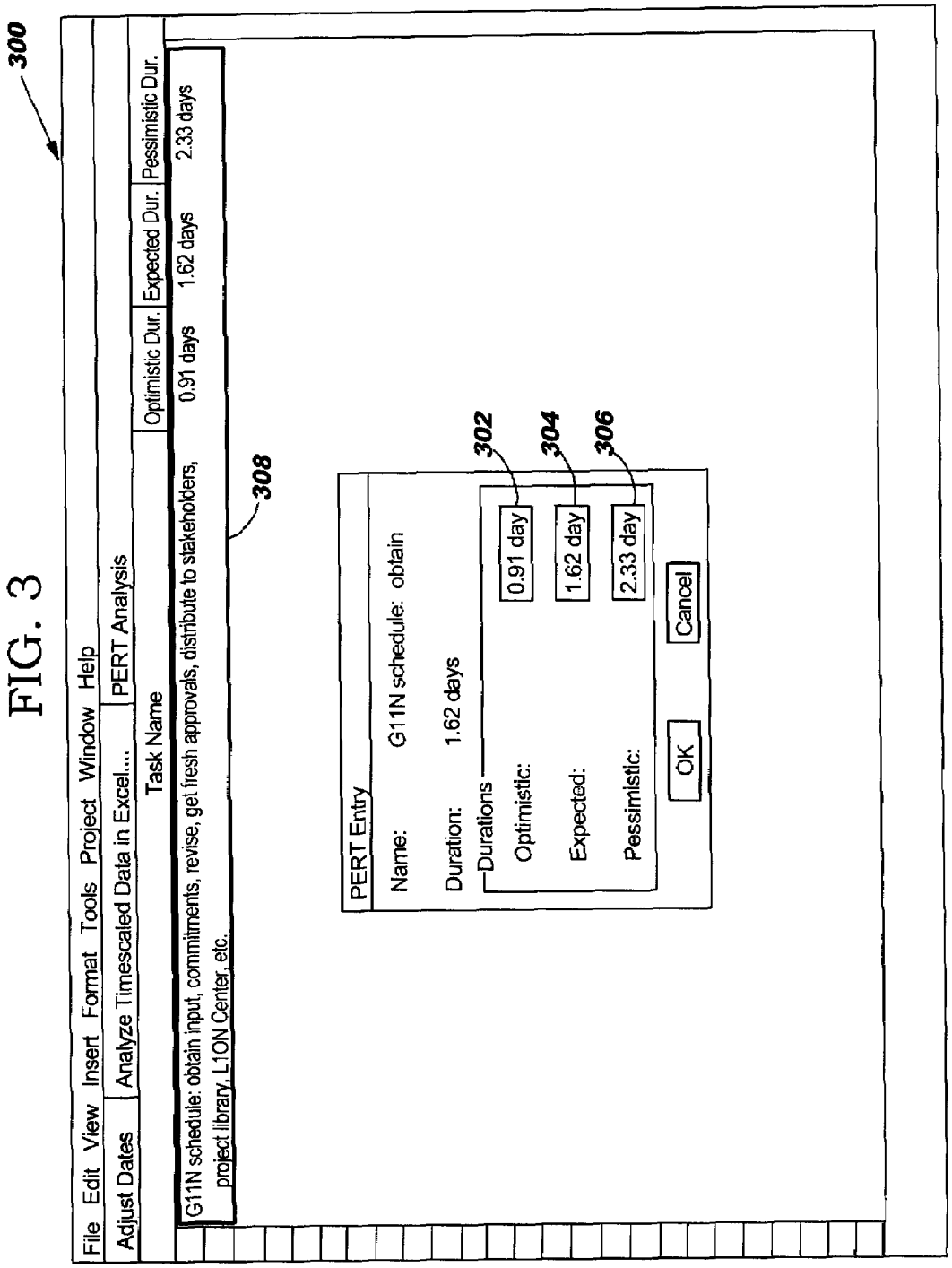
FIG. 3 is an example of a graphical user interface, screen shot or the like for a user to enter at least optimistic, pessimistic and expected time requirements to rework or modify each task of a project requiring rework or modification in response to any potential project changes in accordance with an embodiment of the present invention.

FIGS. 1A and 1B (collectively FIG. 1) are a flow chart of a method 100 to gauge and control churn of a project in accordance with one embodiment of the present invention. In block 102, a project-specific task list may be entered. Referring also to FIG. 2, FIG. 2 is an example of a graphical user interface 200, screen shot, web page or the like for a user or project manager to enter all tasks or selected tasks 202 included in a project in accordance with an embodiment of the present invention. The tasks may be numbered or listed in the order in which the tasks may be completed, in order of importance, descending or ascending order of estimated time of completion or some other order selected by the user or project manager. A task name 204 or short description may be provided to identify each task. Referring back to FIG. 1, in block 104, heuristic information on each task or selected tasks may be collected. The heuristic information may include the time or duration to complete the same or a similar task in another project or may be a sampling of times to complete the same or similar task in other projects. Peers or other project managers on similar projects may be polled or surveyed for their experience-based estimate of the best or optimistic, worst or pessimistic and most likely or expected time requirements to rework or modify any tasks requiring rework or modification in response to any potential project changes. In block 106, the optimistic, pessimistic and expected time requirements to rework each selected or each project task that may require rework or modification in response to any potential project change may be entered. Referring also to FIG. 3, FIG. 3 is an example of a graphical user interface 300, screen shot, web page or the like for a user to enter at least optimistic 302, pessimistic 304 and expected time requirements 306 to rework or modify each task 308 of a project requiring rework or modification in response to any potential project changes in accordance with an embodiment of the present invention.

Figure 4:
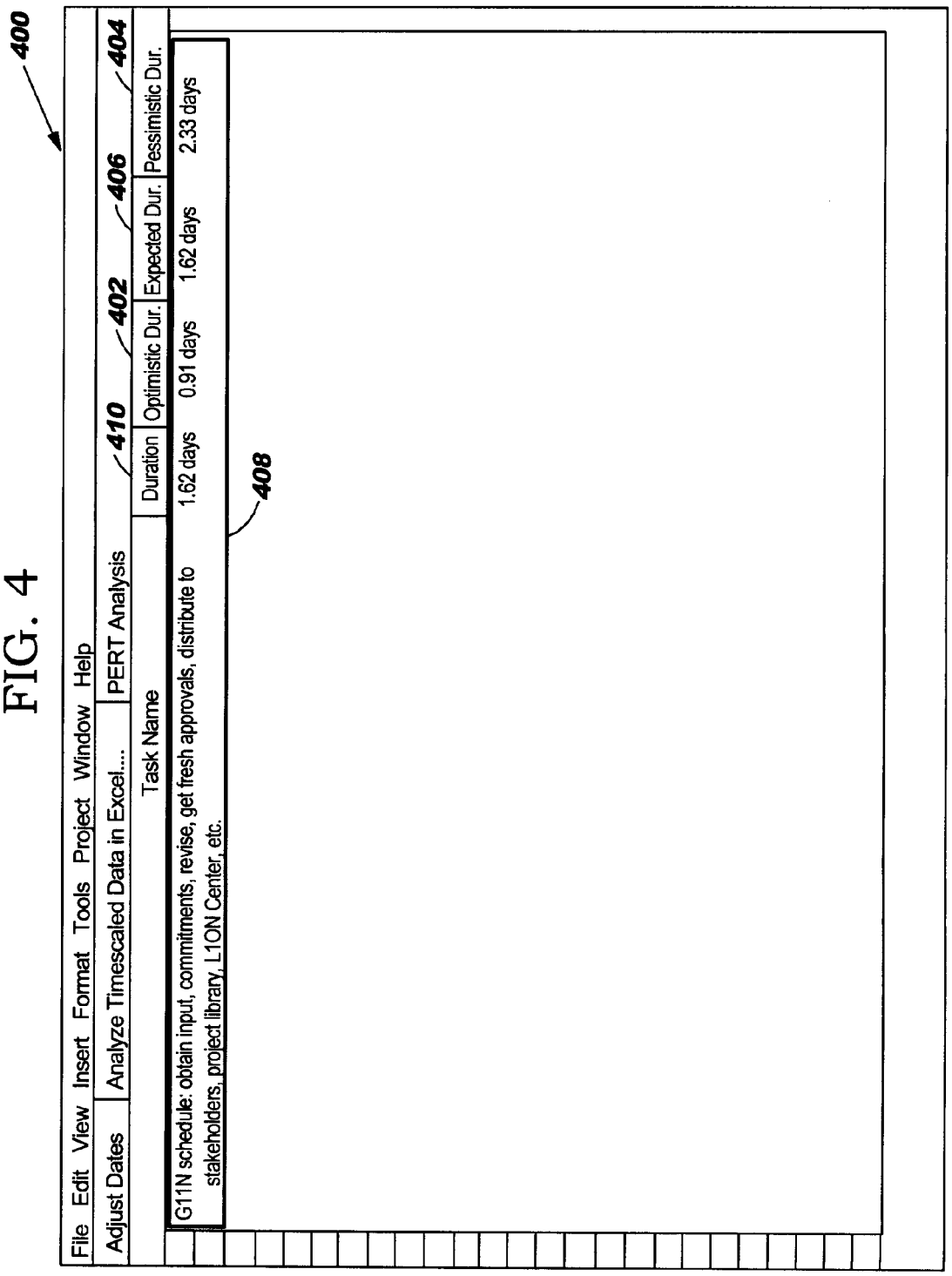
FIG. 4 is a example of a graphical user interface, screen shot or the like to present to a user optimistic, pessimistic and expected time requirements to modify a task along with an average time requirement or duration to rework or modify a task requiring rework or modification in response to any potential project changes in accordance with an embodiment of the present invention.

Referring back to FIG. 1, in block 108, an average rework time requirement may be determined to rework or modify each selected task or each task of the project requiring rework or modification in response to any potential project changes. The average rework time requirement may include averaging at least the optimistic, pessimistic and expected time requirements to rework or modify each task of the project requiring rework, modification or redo in response to any potential project changes. FIG. 4 is a example of a graphical user interface 400, screen shot, web page or the like to present to a user optimistic 402, pessimistic 404 and expected 406 time requirements to modify a task 408 along with an average rework time requirement or duration 410 to rework or modify the task 408 requiring rework or modification in response to any potential project changes in accordance with an embodiment of the present invention.

Figure 5:
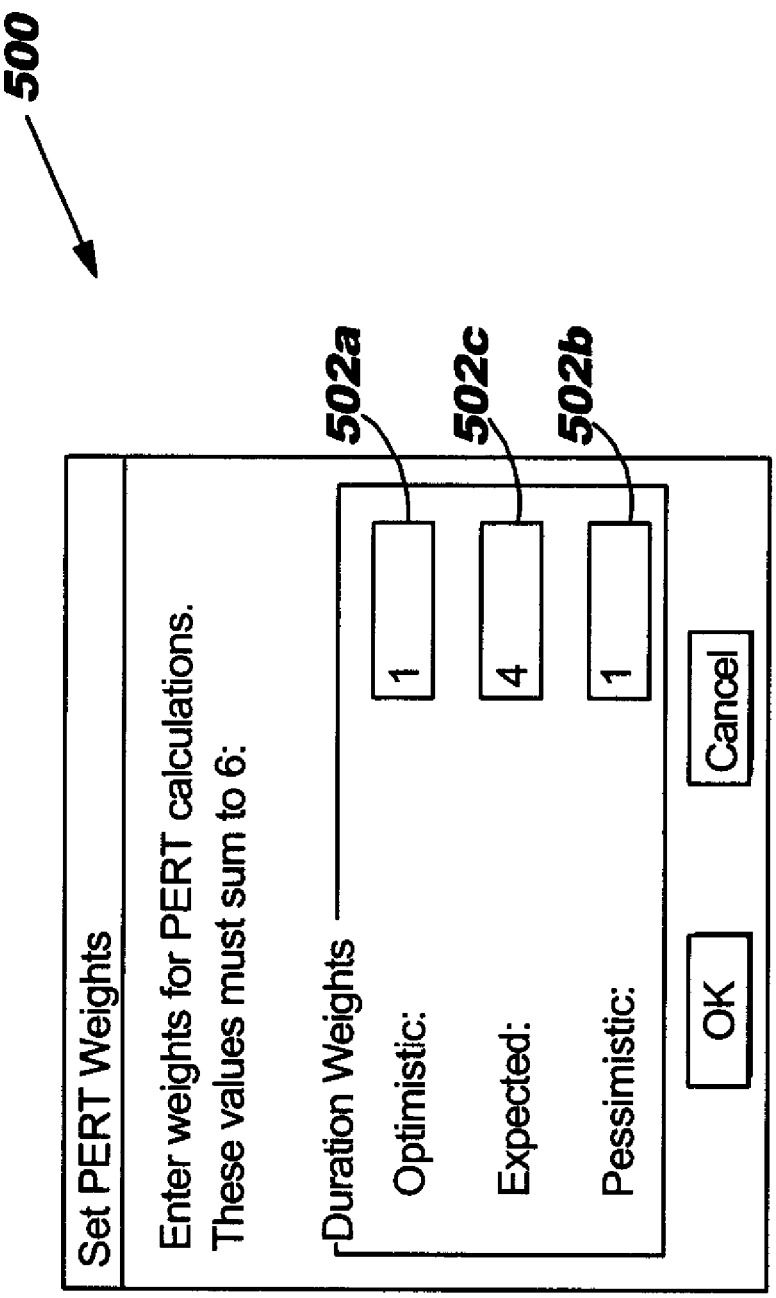
FIG. 5 is a example of a graphical user interface, screen shot or the like for a user to enter a weight factor for each of the optimistic, pessimistic and expected time requirements to perform a weighted average duration analysis in accordance with an embodiment of the present invention.

Referring back to FIG. 1, in block 110, a weight factor or duration factor may be entered by a user or project manager for each of the optimistic, pessimistic and expected time requirements. FIG. 5 is a example of a graphical user interface 500, screen shot, web page or the like for a user or project manager to enter a weight factor 502 or duration factor for each of the optimistic 502a, pessimistic 502b and expected 502c time or duration requirements to perform a weighted average duration analysis in accordance with an embodiment of the present invention.

In block 112, an analysis program or weighted average duration analysis on an average time requirement may be performed for each selected task or for each task of the project requiring rework or modification in response to any potential project changes. The weighted average duration analysis program may be a program evaluation and review technique (PERT) or the like. In block 114, an impact to the project may be determined in response to or from the weighted average duration analysis. The project impact may be defined as a number of days that the project may be delayed in completion based on the project churn determined from the method 100. In block 116, the impact to the project may be presented to the user or project manager. FIG. 6 is an example of a graphical user interface 600, screen shot, web page or the like to present the impact 602 on a project to the user based on the project churn as determined from the method 100. The impact 602 may represent a warning to the user or project manager that additional resources need to be negotiated and committed to the project, if the project is to be completed efficiently with a desired quality and minimal adverse affect on morale and other factors. The advance warning may also be an indication that the project may not be successfully completed without an allocation of additional resources.

Referring back to FIG. 1, in block 118, additional resources may be allocated to the project in response to the impact to the project to insure timely and efficient completion of the project with the desired quality and minimal adverse affect to morale and other factors. In block 120, any reworked tasks and the time duration to complete each reworked task may be tracked during the course of the project. This information may be entered in a spreadsheet, such as Microsoft® Excel® or the like, or other means of collecting and organizing the data. The information or data may then be used as heuristic information for the method 100 for future projects that may include the same or similar tasks in determining project churn and the impact to the project.

FIG. 7 is a block diagram of an example of a typical system 700 to gauge and control churn of a project in accordance with an embodiment of the present invention. Elements of the method 100 of FIG. 1 may be implemented or embodied in the system 700. The system 700 may include a system bus 702 for communication between different components of the system 700. The system 700 may also include a processor 704 that may be coupled to the system bus 702. The processor 704 may include software 706, computer-usable or computer-executable instructions or the like that may embody elements of the method 100 to gauge and control churn of a project. For example, the software 706 may include an analysis program, such as a weighted average duration analysis, program evaluation and review technique (PERT) or the like, to determine an impact to the project in response to any potential project changes. The processor 704 may also include a user interface generator 708 or similar device to generate graphical user interfaces, screen shots, web pages or the like, such as graphical user interfaces 200, 300, 400, 500 and 600 of FIGS. 2-6 respectively, under the control of or in association with the software 706. The user interface generator 708 may be hardware, software, firmware or the like. A system memory 710 may also be coupled to the system bus 702. The system memory 710 may include a random access memory (RAM) 712 or similar data storage arrangement to store software 714. Elements of the method 100 may be embodied as software, computer-usable or computer-executable instructions stored in the system memory 710. One or more input devices 716 and 718 may also be coupled to the system bus 702 via input/output interfaces 720 or the like. Input devices 716 and 718 may also be combination input/output devices. The input devices 716 and 718 may be any of an optical, magnetic, infrared, voice recognition or radio frequency input device, combination input/output device or the like. The input devices 716 and 718 or combination input/output devices may receive, read or download software or the like, such as software 722 that may embody elements of the method 100, from a medium 724. Examples of the medium 724 may be or form part of a communication channel, memory or similar devices. The medium 724 may be any medium that may contain, store, communicate or transport the data embodied thereon for use by or in connection with the input device 716 or system 700. The medium 724 may, for example, be an electronic, magnetic, optical, electromagnetic, infrared or semiconductor system or the like. The medium 724 may also be simply a stream of information being retrieved when the data is "downloaded" through a network such as the Internet or a private network. The input devices 718 may be a keyboard, pointing device or the like. The input devices 718 may be used to enter information into the graphical user interfaces described with respect to FIGS. 2-6 for performing and controlling operation of the method 100.

One or more output devices 726 may also be coupled to the system bus 702 via an I/O interface 720 or the like. The output devices 726 may include a display or monitor, printer, audio system or the like. The output devices 726 may be used to present the graphical user interfaces 200, 300, 400, 500 and 600 of FIGS. 2-6 respectively to a user or project manager.

The system 700 may also be coupled to a communication network or medium 728. The communication medium or network 728 may be coupled to the system bus 702 via an I/O interface 720 or the like. The communication network or medium 728 may be any communication system including by way of example, dedicated communication lines, telephone networks, wireless data transmission systems, two-way cable systems, customized computer networks, interactive kiosk networks, the Internet and the like.

Elements of the present invention, such as method 100, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 700 of FIG. 7. Examples of such a medium may be illustrated in FIG. 7 as input devices 716 and 718 or medium 724. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as network 728, the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method to gauge and control churn of a project, comprising:
   determining an estimated project churn, wherein project churn includes any identifiable and unplanned changes to a scope of the project;
   identifying at least one task of the project requiring rework or modification;
   collecting heuristic information on each task of the project requiring rework or modification in response to any potential project changes for determining the estimated project churn, wherein collecting heuristic information comprises at least one of:
      collecting a time to complete a same or a similar task in another project;
      sampling a plurality of times to complete the same or similar task in a plurality of other projects; and
      surveying a plurality of experienced project managers to provide an estimated time requirement to complete the task;
   entering at least optimistic, pessimistic and expected time requirements for reworking or modifying each task of the project requiring rework or modification in response to any potential project changes; and allocating resources in response to the estimated project churn based on the collected heuristic information and the at least optimistic, pessimistic and expected time requirements for each task of the project.

2. The computer-implemented method of claim 1, further comprising performing a weighted average duration analysis for each task of the project requiring rework or modification in response to any potential project changes.

3. The computer-implemented method of claim 1, further comprising determining an average time requirement to rework or modify each task of the project requiring rework or modification in response to any potential project changes.

4. The computer-implemented method of claim 3, wherein determining the average time requirement comprises averaging at least an optimistic, pessimistic and expected time requirement to rework or modify each task of the project requiring rework or modification in response to any potential project changes.

5. The computer-implemented method of claim 4, further comprising entering a weight factor for each optimistic, pessimistic and expected time requirement.

6. The computer-implemented method of claim 5, further comprising performing a weighted average duration analysis on the average time requirement for each task of the project requiring rework or modification in response to any potential project changes.

7. The computer-implemented method of claim 6, further comprising determining an impact to the project in response to the weighted average duration analysis.

8. The computer-implemented method of claim 1, further comprising tracking reworked tasks and time duration to complete each reworked task during the course of the project.

9. A computer-implemented method to gauge and control churn of a project, comprising:
entering a project-specific task list;
identifying at least one task requiring rework or modification;
entering at least optimistic, pessimistic and expected time requirements to rework or modify each task of the project requiring rework or modification in response to any potential project changes;
collecting heuristic information on each task of the project to determine the optimistic, pessimistic and expected time requirement to rework or modify each task of the project requiring rework or modification in response to any potential project changes, wherein collecting heuristic information comprises at least one of:
  collecting a time to complete a same or a similar task in another project;
  sampling a plurality of times to complete the same or similar task in a plurality of other projects;
  surveying a plurality of experienced project managers to provide an estimated time requirement to complete the task;
entering a weighting factor for each of the optimistic, pessimistic and expected time requirements to perform a weighted average duration analysis;
determining an average time requirement to rework or modify each task requiring rework or modification in response to any potential project changes;
performing the weighted average duration analysis on any tasks requiring rework or modification in response to any potential project changes;
determining an impact to the project in response to the weighted average duration analysis; and
presenting the impact to a user.

10. The computer-implemented method of claim 9, wherein performing the weighted average duration analysis comprises performing a program evaluation and review technique (PERT).

11. The computer-implemented method of claim 9, wherein determining the impact to the project comprises totaling times for all affected tasks from the weighted average duration analysis.

12. The computer-implemented method of claim 9, further comprising allocating resources in response to the impact to the project.

13. The computer-implemented method of claim 9, further comprising tracking reworked tasks and time duration to complete each reworked task during the course of the project.

14. The computer-implemented method of claim 9, further comprising presenting the impact to the project to provide an early warning.

15. The computer-implemented method of claim 9, wherein entering the project-specific tasks comprises generating a graphical user interface for a user to enter the tasks.

16. The computer-implemented method of claim 9, wherein entering the at least optimistic, pessimistic and expected time requirements comprises generating a graphical user interface for a user to enter the time requirements.

17. A system to gauge and control churn of a project, comprising:
an input device to enter heuristic information on each task of a project requiring rework or modification in response to any potential project changes, wherein the project has at least one task requiring rework or modification, and wherein the heuristic information comprises:
  time to complete a same or a similar task in another project;
  a sampling of a plurality of times to complete the same or similar task in a plurality of other projects; and
  a survey a plurality of experienced project managers to provide an estimated time requirement to complete the task; and
a user interface generator to generate a graphical user interface displayable to a user to enter at least optimistic, pessimistic and expected time requirements for reworking or modifying each task of the project requiring rework or modification in response to any potential project changes;
a processor;
an analysis program operable on the processor to determine an impact to the project in response to any potential project changes using the heuristic information, wherein the analysis program is adapted to utilize the at least optimistic, pessimistic and expected time requirements for each task of the project and a weighting factor for each of the at least optimistic, pessimistic and expected time requirements to determine the impact to the project; and
an output device to present the impact to a user.

18. The system of claim 17, further comprising a display to present graphical user interfaces for entering the heuristic information and other information.

19. The system of claim 18, further comprising a user interface generator to generate a graphical user interface displayable to a user on the display to enter a project-specific task list.

20. The system of claim 17, wherein the user interface generator is adapted to generate a graphical user interface to enter the weighting factor for each of the at least optimistic, pessimistic and expected time requirements to perform a weighted average duration analysis.

21. The system of claim 17, wherein the analysis program comprises a weighted average duration analysis program.

22. The system of claim 21, wherein the analysis program comprises a programmed evaluation and review technique (PERT).

23. The system of claim 17, further comprising means to track reworked tasks and time duration to complete each reworked task during the course of the project.

24. The system of claim 17, further comprising means to allocate resources in response to the impact to the project.

25. A computer-readable storage medium encoded with computer-executable instructions for performing a method, wherein the computer-readable storage medium is one of an electronic, optical, electromagnetic, infrared or semiconductor system, the method comprising:
- determining an estimated project churn, wherein project churn includes any identifiable and unplanned changes to a scope of the project;
- identifying at least one task requiring rework or modification;
- collecting heuristic information on each task of the project requiring rework or modification in response to any potential project changes for determining the estimated project churn, wherein collecting heuristic information comprises at least one of:
  - collecting a time to complete a same or a similar task in another project;
  - sampling a plurality of times to complete the same or similar task in a plurality of other projects; and
  - surveying a plurality of experienced project managers to provide an estimated time requirement to complete the task;
- entering at least optimistic, pessimistic and expected time requirements for reworking or modifying each task of the project requiring rework or modification in response to any potential project changes; and
- allocating resources in response to the estimated project churn based on the collected heuristic information and the at least optimistic, pessimistic and expected time requirements for each task of the project.

26. The computer-readable storage medium encoded with computer executable instructions for performing the method of claim 25, further comprising performing a weighted average duration analysis for each task of the project requiring rework or modification in response to any potential project changes.

27. The computer-readable storage medium encoded with computer executable instructions for performing the method of claim 25, further comprising determining an average time requirement to rework or modify each task of the project requiring rework or modification in response to any potential project changes.

28. The computer-readable storage medium encoded with computer executable instructions for performing the method of claim 25, wherein determining the average time requirement comprises averaging at least an optimistic, pessimistic and expected time requirement to rework or modify each task of the project requiring rework or modification in response to any potential project changes.

29. The computer-readable storage medium encoded with computer executable instructions for performing the method of claim 28, further comprising entering a weight factor for each optimistic, pessimistic and expected time requirement.

30. The computer-readable storage medium encoded with computer executable instructions for performing the method of claim 29, further comprising performing a weighted average duration analysis on the average time requirement for each task of the project requiring rework or modification in response to any potential project changes.

31. The computer-readable storage medium encoded with computer executable instructions for performing the method of claim 1, further comprising generating a graphical user interface for a user to enter a project-specific task list.

32. The computer-readable storage medium encoded with computer executable instructions for performing the method of claim 1, further comprising generating a graphical user interface for a user to enter at least optimistic, pessimistic and expected time requirements to rework or modify each task of the project requiring rework or modification in response to any potential project changes.

33. The computer-readable storage medium encoded with computer executable instructions for performing the method of claim 32, further comprising generating a graphical user interface for a user to enter a weight factor for each optimistic, pessimistic and expected time requirement.

* * * * *